United States Patent
Xhafa et al.

(10) Patent No.: US 11,818,643 B2
(45) Date of Patent: *Nov. 14, 2023

(54) SYSTEMS AND METHODS TO SUPPORT NODE MOBILITY IN WIRELESS NETWORKS

(71) Applicant: TEXAS INSTRUMENTS INCORPORATED, Dallas, TX (US)

(72) Inventors: Ariton Xhafa, Plano, TX (US); Jianwei Zhou, Allen, TX (US); Xiaolin Lu, Plano, TX (US); Il Han Kim, Allen, TX (US); Kaichien Tsai, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/517,700

(22) Filed: Nov. 3, 2021

(65) Prior Publication Data

US 2022/0060962 A1 Feb. 24, 2022

Related U.S. Application Data

(63) Continuation of application No. 15/703,668, filed on Sep. 13, 2017, now Pat. No. 11,197,222.

(Continued)

(51) Int. Cl.
*H04W 40/02* (2009.01)
*H04W 36/00* (2009.01)
(Continued)

(52) U.S. Cl.
CPC ......... *H04W 40/023* (2013.01); *H04L 12/189* (2013.01); *H04L 49/201* (2013.01);
(Continued)

(58) Field of Classification Search
CPC ....... H04W 4/0006; H04W 4/08; H04W 4/38; H04W 4/30–38; H04W 4/70–80; H04L 49/201; H04L 12/89
See application file for complete search history.

(56) References Cited

U.S. PATENT DOCUMENTS

2003/0163554 A1    8/2003   Sendrowicz
2009/0207954 A1    8/2009   Dai
(Continued)

OTHER PUBLICATIONS

"Part 15.4: Low-Rate Wireless Personal Area Networks (LR-WPANs)," IEEE Standard for Local and metropolitan area networks, Amendment 1: MAC sublayer, Apr. 16, 2012, 225 pages.

*Primary Examiner* — San Htun
(74) *Attorney, Agent, or Firm* — Mandy Barsilai Fernandez; Frank D. Cimino

(57) ABSTRACT

A network includes a mobile network node (MNN) that includes a mobile node communications manager (MNCM) to facilitate wireless communications to a plurality of stationary network nodes (SNNs) in a wireless network via a wireless network protocol. The MNCM utilizes a multicast address received over the wireless network. The multicast address is assigned to a predetermined network time slot to communicate uplink data from the MNN to the SNNs. The MNN receives downlink data via a separate predetermined network address and time slot assigned to a given SNN.

20 Claims, 4 Drawing Sheets

Related U.S. Application Data

(60) Provisional application No. 62/459,839, filed on Feb. 16, 2017.

(51) Int. Cl.
  *H04L 49/201* (2022.01)
  *H04W 8/26* (2009.01)
  *H04L 12/18* (2006.01)
  *H04W 74/08* (2009.01)
  *H04W 72/20* (2023.01)
  *H04W 72/27* (2023.01)
  *H04W 72/30* (2023.01)
  *H04W 92/20* (2009.01)
  *H04W 76/15* (2018.01)
  *H04W 84/18* (2009.01)

(52) U.S. Cl.
  CPC ......... *H04W 8/26* (2013.01); *H04W 36/0033* (2013.01); *H04W 72/20* (2023.01); *H04W 72/27* (2023.01); *H04W 72/30* (2023.01); *H04W 74/0808* (2013.01); *H04W 76/15* (2018.02); *H04W 84/18* (2013.01); *H04W 92/20* (2013.01)

(56) References Cited

U.S. PATENT DOCUMENTS

| | | |
|---|---|---|
| 2009/0238140 A1 | 9/2009 | Kojima |
| 2010/0046524 A1 | 2/2010 | Rune |
| 2010/0316033 A1 | 12/2010 | Atwal |
| 2011/0026500 A1 | 2/2011 | Shaffer |
| 2011/0317559 A1* | 12/2011 | Kern ..................... H04L 45/02 370/252 |
| 2013/0121335 A1* | 5/2013 | Hui ........................ H04L 45/14 370/390 |
| 2015/0208316 A1 | 7/2015 | Mosko |
| 2015/0244513 A1 | 8/2015 | Hartman |
| 2015/0327261 A1* | 11/2015 | Thubert .............. H04W 74/085 370/336 |
| 2016/0020967 A1 | 1/2016 | Thubert |
| 2016/0021017 A1* | 1/2016 | Thubert .................. H04L 47/28 370/235 |
| 2016/0174192 A1 | 6/2016 | Raghu |
| 2016/0219415 A1* | 7/2016 | Purohit ................... H04L 45/16 |
| 2016/0330713 A1 | 11/2016 | Vijayasankar |

\* cited by examiner

SYSTEMS AND METHODS TO SUPPORT NODE MOBILITY IN WIRELESS NETWORKS

CROSS-REFERENCE TO RELATED APPLICATION

This application is a continuation of U.S. patent application Ser. No. 15/703,668 filed on Sep. 13, 2017, which claims the benefit of U.S. Provisional Patent Application 62/459,839 filed on Feb. 16, 2017, and entitled Systems and Methods to Support Node Mobility in Wireless Sensor Networks, the entirety of both are incorporated by reference herein.

TECHNICAL FIELD

This disclosure relates to networks, and more particularly to a mobile network node that communicates with a plurality of stationary network nodes via a multicast address.

BACKGROUND

Network time slotted protocols are widely used to establish communications between network nodes utilizing a predictable time frame slotting technique for nodes to communicate, where each network node communicates according to predefined time slots. Such protocols generally provide scheduled, contention-free channel access to improve throughput performance compared to carrier sense techniques. These protocols are often employed in the formation of ad hoc wireless communications networks, for example. Ad hoc wireless communications networks are formed dynamically as nodes come within range of existing network resources. These networks may be utilized in many applications to provide communications between lower level devices on the networks such as sensors and upper tier devices communicating with the sensors.

In some applications, routing protocols are created that define relationships in the network and how the network operates as conditions change. For example, each node within the network can have a preferred parent node for communications in an upwards direction and possibly having multiple intermediate nodes and/or child nodes for downward communications.

A multi-hop wireless network consists of a root node, intermediate nodes, and child nodes which are also referred to as leaf nodes. The root node connects the network to an internal or external network. The intermediate node connects the leaf nodes (and other intermediate nodes) to the root node and from there to the internal/external network. The definition of leaf/child nodes is that there are no other nodes connected to these nodes. In beacon channel hopping networks, a coordinator transmits periodic beacons that contain information to facilitate nodes joining and communicating in the network.

The information contained in the beacon could be the channels to be used at a specific time, timing information when this beacon is sent, link information, and so forth. To transmit data in these networks, the nodes can then use the link information, which can be a pair of (channel, time) to communicate and send data to their respective neighbors. In order to use the link information, nodes are to be synchronized and receive beacons. Intermediate nodes also transmit beacons and in these beacons, the same information that was sent by the coordinator is repeated. This is to allow other intermediate and leaf/child nodes to connect to the network.

While there are other approaches and methods to maintain synchronization in a static network where nodes are not mobile, maintaining synchronization and data communications when a node is mobile and moving throughout the network is challenging.

SUMMARY

This disclosure relates to a mobile network node that communicates with a plurality of stationary network nodes via a multicast address. In one example, a network includes a mobile network node (MNN) that includes a mobile node communications manager (MNCM) to facilitate wireless communications to a plurality of stationary network nodes (SNNs) in a wireless network via a wireless network protocol. The MNCM utilizes a multicast address received over the wireless network. The multicast address is assigned to a predetermined network time slot to communicate uplink data from the MNN to the SNNs. The MNN receives downlink data via a separate predetermined network address and time slot assigned to a given SNN.

In another example, a network includes a plurality of stationary network nodes (SNNs) to communicate with a mobile network node (MNN). The SNNs and the MNN communicate in a wireless network via a wireless network protocol. Each of the SNNs includes a stationary node communications manager (SNCM) and the MNN includes a mobile node communications manager (MNCM) to facilitate communications between the MNN and the plurality of SNNs. The MNCM utilizes a multicast address received over the wireless network. The multicast address is assigned to a predetermined network time slot to communicate uplink data from the MNN to the SNNs. A coordinator node assigns each of the SNCMs a separate predetermined network address and time slot to communicate downlink data from each SNN to the MNN. The SNCM of each SNN receives coordination data from the coordinator node indicating a communications order in which each SNN is to send an acknowledgment to a data packet received from the MNN.

In yet another example, a method includes transmitting data via a multicast address received over a wireless network. The multicast address is assigned to a predetermined network time slot to communicate uplink data from a mobile network node (MNN) to a plurality of stationary network nodes (SNNs). The method includes receiving downlink data at the MNN via a separate predetermined network address and time slot assigned for each SNN. The method includes receiving an acknowledgment at the MNN from at least one of the plurality of SNNs in response to the uplink data communicated from the multicast address.

DETAILED DESCRIPTION

This disclosure relates to a mobile network node that communicates with a plurality of stationary network nodes via a multicast address. Before or after a mobile node joins a network, a group of stationary network nodes can be designated by a coordinator node to collectively serve the mobile network node as it moves about a given location. The mobile network node can send uplink data from the mobile node to the stationary nodes via the multicast address without having to reinitiate a network connection each time communications are disrupted with a given stationary node as it moves about the given location as with previous systems. In this manner, as the mobile node moves out of range of one stationary node and in range of another, uplink communications can continue uninterrupted via the multicast broadcast to the respective stationary nodes. The multicast address can be assigned to a predetermined network time slot to communicate uplink data from the mobile node to the stationary nodes. The coordinator node can assign each of the stationary nodes a separate predetermined network address and time slot to communicate downlink data from each stationary node to the mobile node. Each stationary node can also receive coordination data from the coordinator node indicating a communications order in which each stationary node is to send an acknowledgment to a data packet received from the mobile node.

Figure 1:
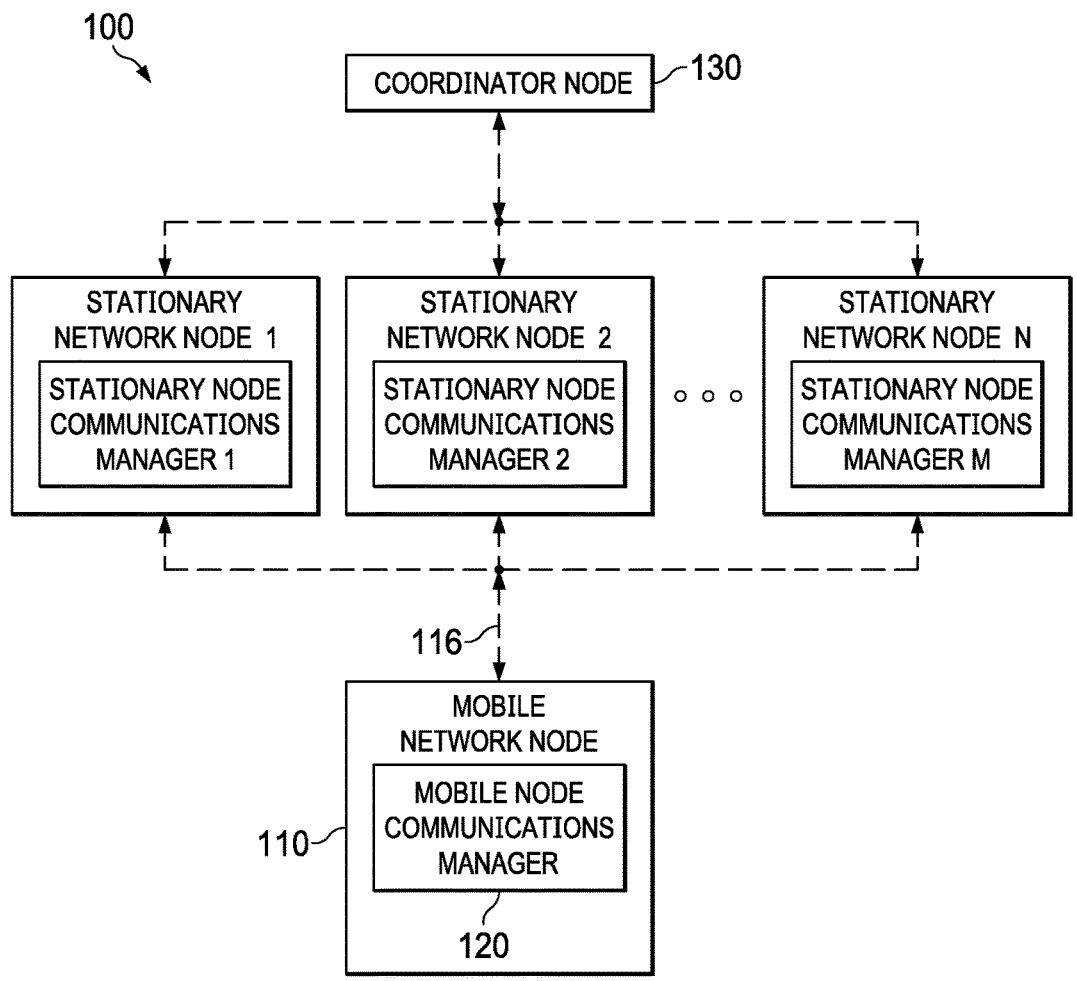
FIG. 1 illustrates an example network where a mobile network node communicates with a plurality of stationary network nodes via a multicast address.

FIG. 1 illustrates an example network 100 where a mobile network node communicates with a plurality of stationary network nodes via a multicast address. The network can include a plurality of stationary network nodes (SNNs) shown as nodes 1 though N to communicate with a mobile network node (MNN) 110, where N is a positive integer. The SNNs 1-N and the MNN 110 communicate in a wireless network shown as dashed line 116 via a wireless network protocol. The wireless network protocol described herein can be any time division multiple access protocol (TDMA), such as a time slotted channel hopping (TSCH) protocol specified according to IEEE 801.15.4e, for example. The MNN 110 includes a mobile node communications manager (MNCM) 120 to facilitate communications between the MNN and the plurality of SNNs 1-N. The MNCM 120 utilizes a multicast address received over the wireless network 116. The multicast address is assigned to a predetermined network time slot to communicate uplink data from the MNN 110 to the SNNs 1-N. Each of the SNNs 1-N communicate downlink data to the MNN 110 via a separate predetermined network address and time slot assigned respectively for a given SNN to communicate with the MNN.

As shown, each of the SNNs 1-N can include a stationary node communications manager (SNCM) 1 though M to receive the separate predetermined network address and time slot assigned for each SNN 1-N to communicate the downlink data to the MNN 110, where M is a positive integer. A coordinator node 130 assigns each of the SNCMs 1-M the separate predetermined network address and time slot to communicate the downlink data from each SNN 1-N to the MNN 110. The SNCM of each SNN 1-N receives coordination data from the coordinator node 130 indicating a communications order in which each SNN is to send an acknowledgment (e.g., ACK packet) to a data packet received from the MNN 110. In one example, the coordination data can specify that one SNN should communicate before another and so forth. Each SNCM 1-M can monitor the network 116 (e.g., monitor fames and time slots for SNN activity) to determine if an SNN higher in the acknowledgement order has transmitted before initiating its own respective acknowledgment. If a given SNN does not transmit in its designated order, subsequent SNNs can initiate the acknowledgment after a predetermined time period. In yet another example relating to how the SNNs initiate an acknowledgment to an uplink data packet received from the MNN 110, the coordination data to the SNCM 1-M can specify that each SNN is to transmit the acknowledgement in response to the data packet received from the MNN regardless of the indicated communications order.

The coordinator node 130 can assign each of the SNCMs the separate predetermined network address and time slot to communicate the downlink data from each SNN 1-N when the SNNs are communicating on the wireless network 116 but before the MNN 110 has joined the wireless network. Thus, if some future MNN 110 were to join the network 116, the SNNs 1-N would already be configured to communication with the MNN. In another example, the coordinator node 130 can assign each of the SNCMs 1-M the separate predetermined network address and time slot to communicate the downlink data from each SNN to the MNN 110 in response to the MNN joining the wireless network 116. The coordinator node 130 can be a root node or an intermediate node, whereas the SNNs 1-N are generally configured as intermediate nodes. The MNN 110 can be a child node or an intermediate node.

The separate predetermined network address and time slot to communicate the downlink data from each SNN 1-N can be transmitted during dedicated timeslots of a network frame for communicating on the wireless network 116 in one example. In another example, the separate predetermined network address and time slot to communicate the downlink data from each SNN 1-N can be transmitted during a shared timeslot of a network frame for communicating on the wireless network.

To mitigate network traffic congestion, the MNN 110 can discard duplicate downlink data received from multiple SNNs 1-N. Also, the SNNs 1-N disable forwarding of uplink packets received from the MNN 110 if the uplink packets have already been forwarded by another SNN to facilitate network bandwidth. To facilitate time synchronization, the MNN 110 can synchronize its time clock to the SNNs 1-N by averaging an amount of time drift that the MNN is from each of the SNNs and adjusting the time clock according to the average drift. Additional discussion of time synchronization and network communications is provided below with respect to the description of FIG. 5.

Figure 2:
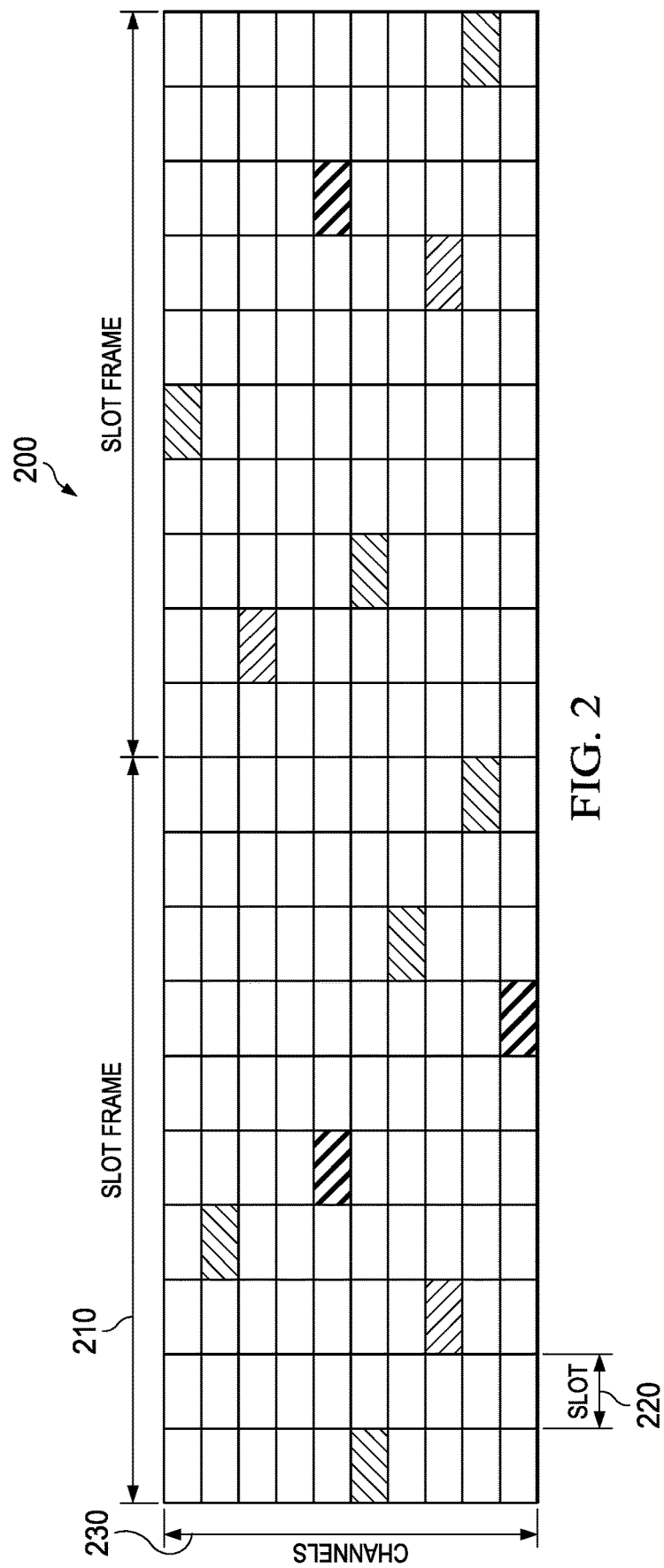
FIG. 2 illustrates an example of a network protocol for mobile node processing and time synchronization that utilizes channels, slot frames and time slots.

FIG. 2 illustrates an example of a network protocol diagram 200 for mobile node processing and time synchronization that utilizes channels, slot frames and time slots. As used herein, the term "time slot" refers to a designated period of time in a communications frame where a given node can receive and/or transmit data, where a slot frame is a basic unit set of contiguous time-slots transmitted according to a schedule that repeats over time. Some time slots in the frame are reserved for beacon communications and some time slots are shared meaning that any node can transmit data during a shared time slot. Shared time slots are also referred to as contention slots since multiple nodes can conflict with each other if each node transmits data during the shared slot. Other time slots are specifically reserved as receive time slots and transmit time slots for each respective node.

The diagram 200 illustrates the mode of operation for a time slotted channel hopping (TSCH) media access control (MAC) although other protocols are possible. Time consists of a slot frame 210, where each slot frame consists of timeslots (or slots) 220. Timeslots can be dedicated for use to a given network node in some examples or be utilized as shared time slots for communications in other examples.

The communication between the nodes in the network occurs during the timeslots 220, although, it can happen across the same or different channels shown at 230. The channels are utilized to account for modulo differences between frames. For example, if a child node communicates on slot two in frame one of a ten slot frame, in the next frame it would communicate on the second slot of the fame which would be twelve slots from the beginning of the first frame. Thus, in the second frame, the child node could communicate on channel three during the second time slot of frame two. For example, if node A and node B are assigned slot 3 in slot frame 1, the channel that they are communicating in this slot frame is channel 3. However, in slot frame 2, the timeslot number is the same; however, the channel number is 5 this time. As noted above, each node computes its own start time for the beginning of the slot frame and where it expects each nodes corresponding slot time in the frame to occur. When nodes are out of time synchronization, the computed time by each node for the beginning of the slot frame 210 differs between nodes. The timing correction/synchronization information described herein can be exchanged (e.g., sent from parent node to network node) or computed (e.g., network node computes base on response in an acknowledgement packet and timing of a received beacon or data frame from the parent node).

Figure 3:
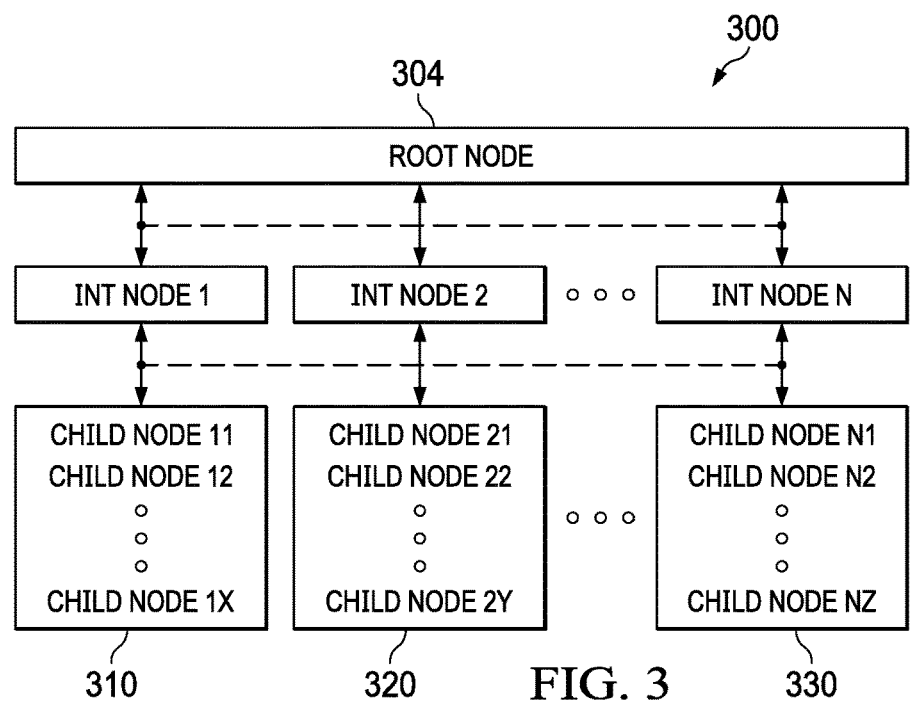
FIG. 3 illustrates an example network configuration having multiple intermediate and child nodes that can periodically exchange network and timing information for mobile node communications.

FIG. 3 illustrates an example network configuration 300 having multiple intermediate and child nodes where a mobile network node communicates with a plurality of stationary network nodes via a multicast address. Each of the intermediate and child nodes shown in the network configuration 300 can include respective signal analyzers and synchronizers as described herein. A top level in the network 300 can include a root node 304 which serves as a parent node to one or more intermediate nodes shown as INT NODE 1 through INT NODE N, where N is a positive integer. Thus, each of the intermediate nodes can be viewed as a child node of the parent nodes. In turn, each of the intermediate nodes 1 though N can have one or more child nodes attached thereto. For example, at 310, child nodes 11 through 1X can report to intermediate node 1 operating as a parent node, where X is a positive integer. At 320, child nodes 21 through 2Y can report to intermediate node 2 operating as a parent node, where Y is a positive integer. At 330, child nodes N1 through NZ can report to intermediate node N operating as a parent node, where Z is a positive integer.

A dashed line is shown between nodes at the intermediate level and another dashed line is shown between nodes at the child level, where each dashed line represents that some nodes may be able to communicate between other members at a common hierarchy level and some nodes may not be able to communicate at the common level. In some network examples, intermediate nodes and/or child nodes may communicate with other nodes at their respective hierarchy levels depending on network topologies and network device locations. In other examples, communications can be routed to and/or from the respective child nodes, through the intermediate nodes, to the root node 304 in order to route messages from one node in the network to another node in the network that is not in the same linear path as the respective root node, intermediate node, and child node. In some examples, the node hierarchy can depend on the physical location and proximity among the nodes in the network (e.g., a centrally located node being a root or intermediate node and edge nodes being child nodes). Additionally or alternatively, node hierarchy can be determined according to the temporal order in which nodes are added to the network (e.g., first node being a root node and last added node being a child node).

The network 300 can be provided as a multi-hop wireless network that consists of the root node 304, intermediate nodes, and child nodes. The root node 304 connects the network to an internal or external network. The intermediate nodes connect the child nodes (and other intermediate nodes) to the root node and from there via the root node to the internal/external network. The definition of child nodes, in this example, is that there are no other nodes connected to these nodes. To transmit data in these networks, the nodes can then use the link information, which can be communication parameters (e.g., specified channel and network time), to communicate and send data to their neighboring nodes. In order to use the link information are to be synchronized and receive beacons. Intermediate nodes also transmit beacons and in these beacons, the same information that was sent by the coordinator is repeated. This is to allow other intermediate and child nodes to connect to and communicate within the network.

Figure 4:
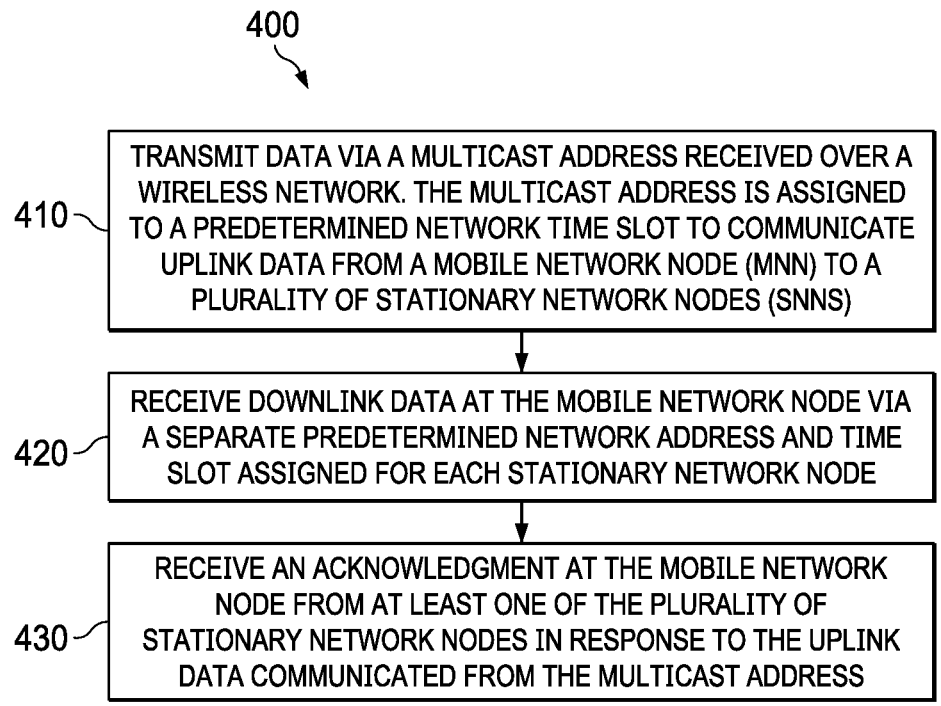
FIG. 4 illustrates an example method where a mobile network node communicates with a plurality of stationary network nodes via a multicast address.

In view of the foregoing structural and functional features described above, an example method will be better appreciated with reference to FIG. 4. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured as machine readable instructions stored in memory and executable in an IC or a processor, for example.

FIG. 4 illustrates an example method 400 where a mobile network node communicates with a plurality of stationary network nodes via a multicast address. At 410, the method 400 includes transmitting data via a multicast address received over a wireless network (e.g., transmitted via mobile network node 110 of FIG. 1). The multicast address can be assigned to a predetermined network time slot to communicate uplink data from a mobile network node (MNN) to a plurality of stationary network nodes (SNNs). At 420, the method 400 includes receiving downlink data at the MNN via a separate predetermined network address and time slot assigned for each SNN (e.g., received via mobile network node 110 of FIG. 1). At 430, the method 400 includes receiving an acknowledgment at the MNN from at least one of the plurality of SNNs in response to the uplink data communicated from the multicast address (e.g., received via mobile network node 110 of FIG. 1). Although not shown, the method 400 can include communicating the downlink data during dedicated timeslots of a network frame or communicating the downlink data during a shared timeslot of a network frame.

Figure 5:
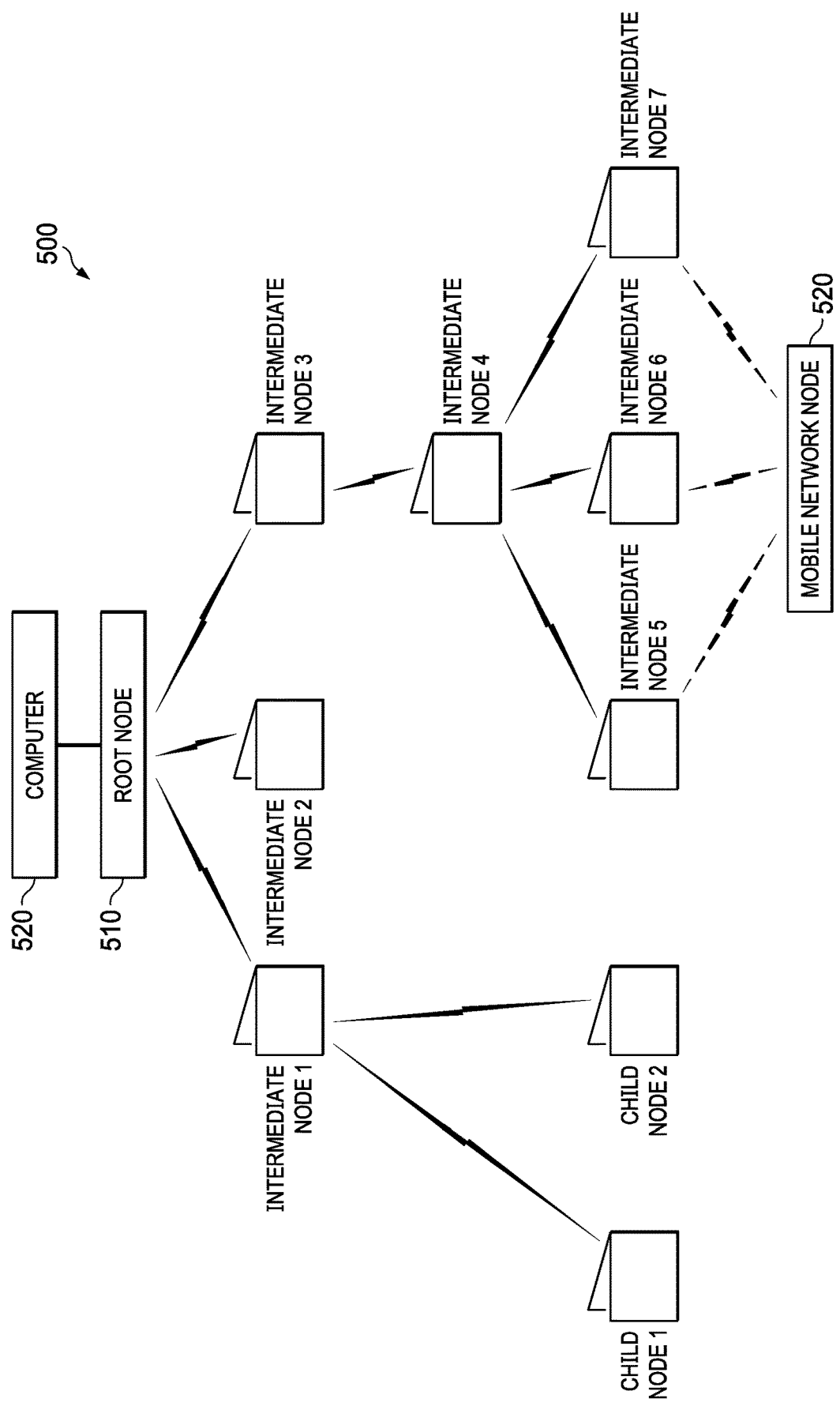
FIG. 5 illustrates an example system where a mobile network node establishes communications with stationary network nodes of the system.

FIG. 5 illustrates an example system 500 where a mobile network node establishes communications with stationary network nodes of the system. As shown, the system 500 can include a root node 510 that can be configured via a network computer 520 (e.g., laptop, cell phone). The root node 510 communicates directly to intermediate nodes though 3 and indirectly to intermediate node 4 that in turn communicates with intermediate nodes 5, 6, 7 which are defined as a stationary group of network nodes to support mobile network node 520. As shown, intermediate node 1 communicates with two stationary leaf nodes 1 and 2. The following provides an example description for the system 500 but other system configurations are possible.

A problem with mobile node 520 can be illustrated via the example depicted in FIG. 5. The mobile leaf node 520 in this example could be a sensor node attached to a moving robot in a factory floor, or a moving tracking system, and so forth. As the mobile node 520 moves in the factory floor and if it was initially connected to intermediate node 5, for example, it can move out of range with intermediate node 5 and then should connect to intermediate node 6 and so on as it moves. However for previous systems, to start transmission of data to node 6, the mobile node 520 would first need to associate and connect via node 6. This would utilize additional scanning time, selecting the parent, and completion of the association handshake, for example. Depending on the network parameter settings, at times, this could take up to a minute or longer, by which time the mobile node 520 could be closer to intermediate node 7. Hence, communication breaks down in such previous systems that do not employ multicasting as described herein.

In TSCH, slots that can be used by all the nodes in the network are called shared slots. Any node can transmit during these slots. Thus, the use of shared slots can be utilized and the mobile node 520 could transmit data to any of the intermediate nodes—intermediate node 5, 6, or 7. However, to achieve that, the mobile node 520 to should know as to which node to transmit to in order to use the destination address in the transmitted frame. This may cause the mobile node 520 to receive beacon nodes from all three intermediate nodes and comparing their received signal strength in real time. This will introduce delays, depending on the settings of beacon intervals.

The networks and methods described herein allow the mobile node 520 to use a multicast address for intermediate nodes 5, 6, and 7. This multicast address can be assigned by the root node 510 at the time that intermediate nodes 5, 6, and 7 joined the network (or at the time the mobile node joins the network). Using the multicast address mitigates the issue of the mobile node 520 trying to determine which node to address the packet to. The multicast packet may or may not involve receiving an acknowledgment response from the stationary intermediate nodes. In case it does not, to facilitate reliability, the mobile node 520 can retransmit the multicast packet to increase robustness (e.g., transmit 2 to 3 versions of the same packet). In case the multicast packet does involve receiving an acknowledgment, this can be addressed by pre-arranging ACK sending of the nodes via coordination data described herein. For example, at the time of joining and assignment of the multicast address, the order that indicates the sending of the ACK packet can also be conveyed to the stationary intermediate nodes.

When the mobile node 520 joins the network, the root node/entity 510 that assigns dedicated links to the mobile node assigns the timeslot to the node, also indicates to the intermediate nodes 5, 6, and 7 in the network that this communication is between the mobile node and the multicast group of intermediate nodes. The assignment of the multicast address and the order of sending ACK packets can be specified via coordination data and communicated to the stationary intermediate nodes at the time of joining the network in one example. Hence, the stationary intermediate nodes can have a dedicated link assignment with the mobile node 520 for downlink data. For example, if timeslot #10 in the slotframe is assigned to mobile node 520 for uplink transmission to the multicast group, intermediate node 5, 6, and 7, this is the receive link and another indication is that it is multicast.

When the multicast packet is transmitted, it can be sent in this particular timeslot number. Additional timeslots can also be assigned to the same node (or multiple nodes) to allow for faster packet transmissions in the network. When the intermediate nodes 5, 6, and 7 receive the multicast packet, they may not/may reply with an ACK frame, depending on the coordination data settings. The received packet at the intermediate nodes can then forward to the next node in the chain based on the routing tables/protocol used. However, packets transmitted by these intermediate nodes do not have to be transmitted at the same dedicated/shared slots and individual slot assignments can be used. If a node receives multiple copies of the packet, it can drop the late received packets. In this manner, the impact on uplink capacity by intermediate nodes forwarding the same packet can be minimized. Transmission of the same packet uplink can impact the overall capacity. However, dropping of duplicate packets at intermediate nodes in the uplink chain can minimize the impact.

Another issue is related to synchronization maintenance of the mobile node 520 with the stationary intermediate nodes. In this example, the mobile node 520 attempts to maintain synchronization with the three intermediate nodes and uses the average timing drift among the three nodes (or the maximum drift) to compensate for the drift. While the above approaches consider uplink traffic from the mobile node 520 to the stationary intermediate nodes, downlink traffic from the stationary nodes can be processed in a slightly different manner. For instance, the intermediate nodes 5, 6, and 7 can have their own assigned transmission timeslots with the mobile node 520. Hence, each of these intermediate nodes can transmit the same packet at their dedicated timeslot addressed to the mobile node 520. The mobile node 520 can discard the duplicate packets if it receives all 3 correctly, for example. While dedicated links for downlink data can be provided, shared slots could also be used. The difference is that collisions are not guaranteed in shared slots. One method to mitigate that condition would be, if there are many shared slots, the order at which each of the intermediate nodes transmits follows the same order that ACK packet order was decided at the time the stationary nodes joined the network (e.g., via coordination data).

Figure 6:
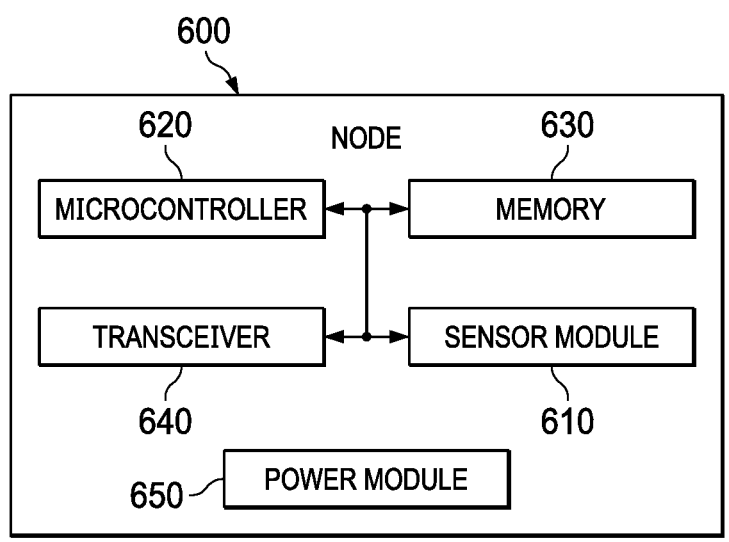
FIG. 6 illustrates an example node that can be employed in a network where a mobile network node communicates with a plurality of stationary network nodes via a multicast address.

FIG. 6 illustrates an example node 600 that can be employed in a network where a mobile network node communicates with a plurality of stationary network nodes via a multicast address. The example node 600 can be employed as part of a wireless sensor network (WSN) or system that contains a plurality (even hundreds of thousands) of sensor nodes. Such network/system examples where the node 600 can be implemented are shown with respect to FIGS. 1 and 3. Each node 600 can be equipped with a sensor module 610 to detect physical phenomena such as light, heat, pressure, and so forth. The sensor nodes in the WSN can communicate among themselves via radio signals utilizing substantially any wireless protocol such as Bluetooth, Bluetooth Low energy (BLE), WIFI, IEEE 802.11, and Worldwide Interoperability for Microwave Access (WiMAX) protocol, Long Term Evolution (LTE), for example. The individual nodes in the WSN are inherently resource constrained, thus they tend to be limited in processing speed, storage capacity, and communication bandwidth. After the sensor nodes are deployed, they are responsible for self-organizing an appropriate network infrastructure often with multi-hop communication with them. The working mode of the sensor nodes may be either continuous or event driven for example.

Wireless sensor networks are spatially distributed autonomous sensors to monitor physical or environmental conditions, such as temperature, sound, pressure, and so forth and to cooperatively pass their data through the network to a main location. The more modern networks are bi-directional, also enabling control of sensor activity. The WSN is built of "nodes," where each node 600 is connected to one (or sometimes several) sensors. The WSN's can include ad-hoc networks where nodes can connect and leave the network dynamically. The node 600 generally includes a microcontroller 620, memory 630 (e.g., ferroelectric random access memory (FRAM)), wireless transceiver 640 (e.g., Texas Instrument CC2500 2.4 GHz RF transceiver), power module 650 (e.g., Texas Instrument BQ25504), along with the sensor module 610 (e.g., temperature detector, infrared detector, input/output module, analog conversion module). Intermediate nodes and child nodes generally share the same hardware and software but change their status (intermediate/child) depending if they are configured per a given communications layer operating with the node memory 630 and/or transceiver 640 such as a routing layer or a network layer, for example. A root node may have one additional level of capability over the intermediate/child nodes which is the ability to connect to other larger/broader networks such as the Internet.

Size and cost constraints on sensor nodes result in corresponding constraints on resources such as energy, memory, computational speed, and communications bandwidth. The topology of the WSNs can vary from a simple star network to an advanced multi-hop wireless mesh network. The propagation technique between the hops of the network can be routing or flooding. Software is typically reduced in complexity to conserve power on respective sensor nodes. Examples of node operating software systems can include TI-RTOS, TinyOS, LiteOS, and Contiki, for example. Other sensor nodes may operate as embedded systems without the use of a given operating system. The node synchronization capabilities described herein can be executed by the microcontroller 620 as executable instructions operating within the memory 630. In an alternative example, the microcontroller 620, memory, transceiver 640, and/or sensor module 610, can be implemented as an application specific integrated circuit.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method comprising:
   assigning, by a coordinator node, a first network address and a first time slot to a first stationary network node (SNN);
   assigning, by the coordinator node, a second network address and a second time slot to a second SNN, wherein the assigning, by the coordinator node, of the first network address and the first time slot to the first SNN occurs before a mobile network node (MNN) has joined a wireless network;
   receiving, by the MNN, a multicast address over the wireless network, wherein the multicast address addresses the first and second SNNs;
   receiving, by the MNN, first downlink data from the first SNN at the first network address during the first time slot, the first downlink data not being received via the second SNN;
   receiving, by the MNN, second downlink data from the second SNN at the second network address during the second time slot, the second downlink data not being received via the first SNN; and
   communicating, by the MNN, uplink data to the first SNN or the second SNN using the received multicast address.

2. The method of claim 1, further comprising:
   disabling, by the first SNN, forwarding of the uplink data received from the MNN responsive to the uplink data having been forwarded by the second SNN.

3. The method of claim 1, wherein the first time slot and the second time slot are dedicated time slots of a network frame for communicating on the wireless network.

4. The method of claim 1, further comprising adjusting, by the MNN, a time clock for the MNN based on a first time drift from the first SNN and a second time drift from the second SNN.

5. The method of claim 4, wherein adjusting the time clock for the MNN comprises performing an averaging function based on the first time drift and the second time drift.

6. The method of claim 1, wherein the MNN receives the first downlink data and the second downlink data over a time slotted channel hopping (TSCH) protocol over the wireless network.

7. The method of claim 1, further comprising discarding, by the MNN, the first downlink data when the first downlink data is a duplicate of a previously received downlink data.

8. The method of claim 1, wherein the MNN is a leaf node of the wireless network.

9. The method of claim 1, further comprising, after communicating the uplink data to the first SNN or the second SNN, receiving an acknowledgement frame from the first SNN or the second SNN.

10. The method of claim 1, wherein the MNN is a mobile robot.

11. A method comprising:
    assigning, by a coordinator node, a first network address and a first time slot to a first stationary network node (SNN);
    assigning, by the coordinator node, a second network address and a second time slot to a second SNN, wherein the assigning, by the coordinator node, of the first network address and the first time slot to the first SNN occurs in response to a mobile network node (MNN) joining a wireless network;
    receiving, by the MNN, a multicast address over the wireless network, wherein the multicast address addresses the first and second SNNs;

receiving, by the MNN, first downlink data from the first SNN at the first network address during the first time slot, the first downlink data not being received via the second SNN;

receiving, by the MNN, second downlink data from the second SNN at the second network address during the second time slot, the second downlink data not being received via the first SNN; and communicating, by the MNN, uplink data to the first SNN or the second SNN using the received multicast address.

12. The method of claim 11, further comprising disabling, by the first SNN, forwarding of the uplink data received from the MNN responsive to the uplink data having been forwarded by the second SNN.

13. The method of claim 11, wherein the first time slot and the second time slot are dedicated time slots of a network frame for communicating on the wireless network.

14. The method of claim 11, further comprising adjusting, by the MNN, a time clock for the MNN based on a first time drift from the first SNN and a second time drift from the second SNN.

15. The method of claim 14, wherein adjusting the time clock for the MNN comprises performing an averaging function based on the first time drift and the second time drift.

16. The method of claim 11, wherein the MNN receives the first downlink data and the second downlink data over a time slotted channel hopping (TSCH) protocol over the wireless network.

17. The method of claim 11, further comprising discarding, by the MNN, the first downlink data when the first downlink data is a duplicate of a previously received downlink data.

18. The method of claim 11, wherein the MNN is a leaf node of the wireless network.

19. The method of claim 11, further comprising, after communicating the uplink data to the first SNN or the second SNN, receiving an acknowledgement frame from the first SNN or the second SNN.

20. The method of claim 11, wherein the MNN is a mobile robot.

* * * * *